(12) United States Patent
Lee et al.

(10) Patent No.: US 11,258,120 B2
(45) Date of Patent: Feb. 22, 2022

(54) METAL AIR BATTERY AND METHOD OF OPERATING THE METAL AIR BATTERY

(71) Applicant: Samsung Electronics Co., Ltd., Suwon-si (KR)

(72) Inventors: Heungchan Lee, Seongnam-si (KR); Hyukjae Kwon, Suwon-si (KR); Dongjoon Lee, Suwon-si (KR); Kyounghwan Choi, Suwon-si (KR); Taeyoung Kim, Seoul (KR); Jungock Park, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 37 days.

(21) Appl. No.: 16/564,528

(22) Filed: Sep. 9, 2019

(65) Prior Publication Data

US 2020/0144687 A1    May 7, 2020

(30) Foreign Application Priority Data

Nov. 7, 2018   (KR) .................. 10-2018-0136040

(51) Int. Cl.
| | | |
|---|---|---|
| *H01M 12/06* | (2006.01) | |
| *H01M 12/04* | (2006.01) | |
| *H01M 12/00* | (2006.01) | |
| *H01M 12/08* | (2006.01) | |
| *H01M 8/04089* | (2016.01) | |
| *H01M 8/04082* | (2016.01) | |
| *H01M 8/0662* | (2016.01) | |
| *H01M 4/38* | (2006.01) | |
| *H01M 4/36* | (2006.01) | |
| *H01M 12/02* | (2006.01) | |

(52) U.S. Cl.
CPC ............ *H01M 12/02* (2013.01); *H01M 12/08* (2013.01)

(58) Field of Classification Search
None
See application file for complete search history.

(56) References Cited

U.S. PATENT DOCUMENTS

| | | |
|---|---|---|
| 8,959,901 B2 | 2/2015 | Mizuno et al. |
| 9,263,779 B2 | 2/2016 | Lee et al. |
| 9,373,874 B2 | 6/2016 | Ryou et al. |
| 10,008,753 B2 | 6/2018 | Kwon et al. |
| 10,103,397 B2 | 10/2018 | Kwon et al. |
| 2004/0197641 A1 | 10/2004 | Visco et al. |

(Continued)

FOREIGN PATENT DOCUMENTS

| | | | | |
|---|---|---|---|---|
| DE | 69401130 | * | 5/1997 | ............ H01M 12/06 |
| EP | 2487748 A2 | | 8/2012 | |

(Continued)

OTHER PUBLICATIONS

English translation of DE 69401130 (Year: 1997).*

(Continued)

*Primary Examiner* — Yoshitoshi Takeuchi
(74) *Attorney, Agent, or Firm* — Cantor Colburn LLP

(57) ABSTRACT

A metal air battery includes a battery module configured to generate electricity by oxidation of metal and reduction of oxygen and water; a water vapor supply unit configured to supply water vapor to the battery module; and a water vapor recovery unit configured to recover the water vapor from the battery module.

11 Claims, 12 Drawing Sheets

(56) References Cited

U.S. PATENT DOCUMENTS

| | | | |
|---|---|---|---|
| 2008/0096061 A1 | 4/2008 | Burchardt | |
| 2014/0227615 A1* | 8/2014 | Friesen | B01D 53/263 429/403 |
| 2016/0344080 A1* | 11/2016 | Ko | H01M 12/08 |
| 2017/0033423 A1 | 2/2017 | Choi | |
| 2017/0117600 A1* | 4/2017 | Kwon | H01M 8/04164 |
| 2017/0222287 A1 | 8/2017 | Suzuki et al. | |
| 2018/0151931 A1 | 5/2018 | Ko et al. | |
| 2019/0305313 A1 | 10/2019 | Kim et al. | |
| 2019/0319322 A1 | 10/2019 | Kwon et al. | |
| 2019/0382525 A1 | 12/2019 | Lee et al. | |
| 2020/0091574 A1 | 3/2020 | Lee et al. | |
| 2020/0112054 A1 | 4/2020 | Lee et al. | |
| 2020/0118769 A1 | 4/2020 | Ma et al. | |
| 2020/0119346 A1 | 4/2020 | Ma et al. | |
| 2020/0119391 A1 | 4/2020 | Ma et al. | |
| 2020/0220179 A1 | 7/2020 | Choi et al. | |

FOREIGN PATENT DOCUMENTS

| | | |
|---|---|---|
| JP | 5751589 B2 | 7/2015 |
| KR | 100296523 B1 | 5/2001 |
| KR | 101119514 B1 | 2/2012 |
| KR | 1020130112314 A | 10/2013 |
| KR | 20170007110 A | 1/2017 |
| KR | 20170013710 A | 2/2017 |
| KR | 1020170014348 A | 2/2017 |
| KR | 1020180062242 A | 6/2018 |
| WO | 9425991 | 11/1994 |

OTHER PUBLICATIONS

European Search Report for European Patent Application No. 19206158.8 dated Apr. 7, 2020.

Y. Suzuki et al., "Electrochemical performance of an all-solid-state lithium-oxygen battery under humidified oxygen," Solid State Ionics, Mar. 11, 2016, vol. 289, pp. 72-76.

* cited by examiner

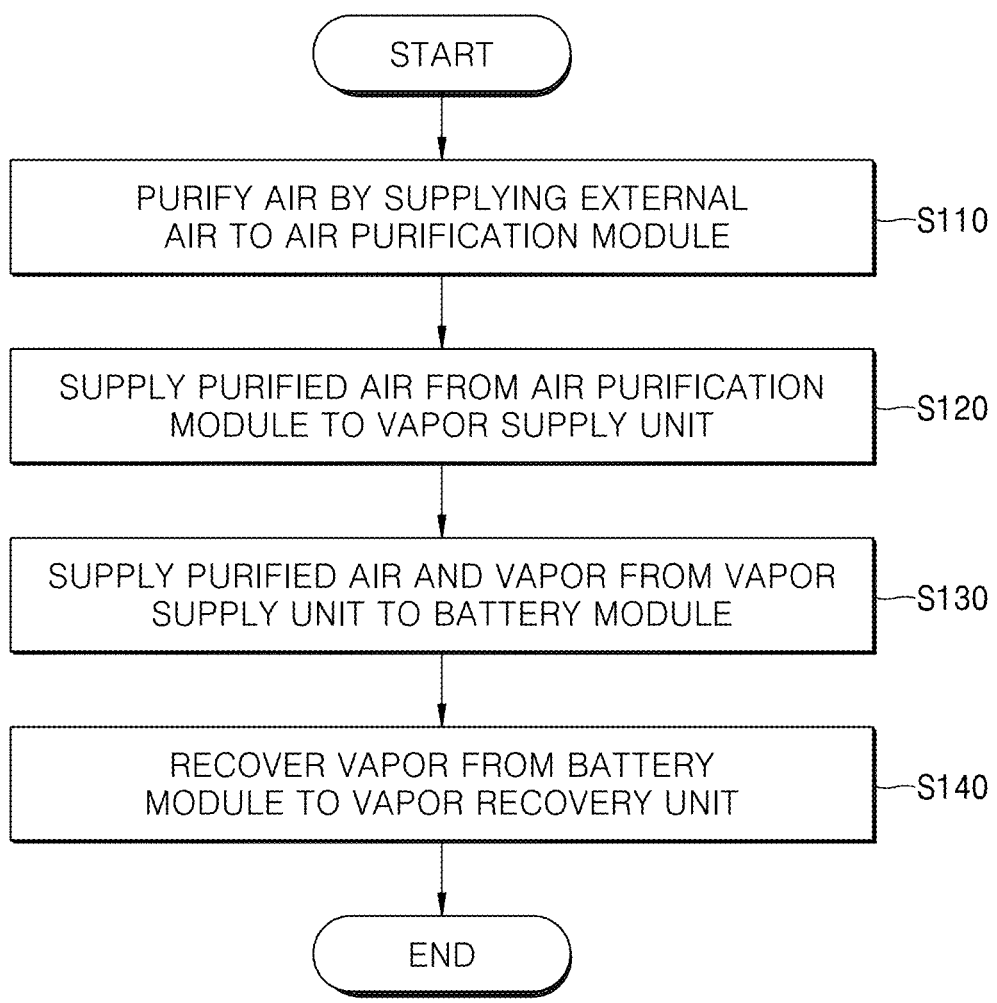

< EXAMPLE >

< COMPARATIVE EXAMPLE >

METAL AIR BATTERY AND METHOD OF OPERATING THE METAL AIR BATTERY

CROSS-REFERENCE TO RELATED APPLICATION

This application claims priority to and the benefit of Korean Patent Application No. 10-2018-0136040, filed on Nov. 7, 2018, in the Korean Intellectual Property Office, and all the benefits accruing therefrom under 35 U.S.C. § 119, the content of which is incorporated herein by reference in its entirety.

BACKGROUND

1. Field

The present disclosure relates to a secondary battery, and more particularly, to a metal air battery and a method of operating the metal air battery.

2. Description of the Related Art

A metal air battery includes an anode that absorbs and emit ions and a cathode that uses oxygen from the air as an active material. In the cathode, reduction and oxidation of oxygen introduced from the outside occurs. In the anode, oxidation and reduction of a metal occurs. The chemical energy generated by the reactions is converted into electrical energy and extracted. For example, a metal air battery absorbs oxygen during discharge and discharges oxygen during charge. Since the metal air battery uses oxygen present in the air, the energy density of the battery may be greatly improved. For example, a metal air battery may have an energy density which is several times greater than a lithium ion battery.

In the metal air battery, the cathode may serve as an electron transfer path and an ion transfer path. Therefore, the capacity and performance of the metal air battery may be influenced by, for example, the material and configuration of the cathode (air electrode). When the metal air battery is a solid metal air battery including a solid electrolyte, a decrease in a reaction rate may occur due to decreased metal ion conductivity and electron conductivity, and increased interface resistance between the cathode and the solid electrolyte.

SUMMARY

According to an aspect of an embodiment, a metal air battery includes a battery module configured to generate electricity by oxidation of metal and reduction of oxygen and water; a water vapor supply unit configured to supply water vapor to the battery module; and a water vapor recovery unit configured to recover the water vapor from the battery module.

The battery module may include: an anode including a metal; a cathode configured to use the oxygen and the water vapor as an active material; and a solid electrolyte layer between the cathode and the anode.

The metal air battery may further include: an air purification module configured to purify air introduced from an outside of the battery module and supply the purified air to the water vapor supply unit.

The vapor supply unit is configured to supply the purified air and the water vapor to the battery module.

The water vapor recovery unit is configured to transfer the air from which vapor is removed to the air purification module, and wherein the water vapor supply unit is configured to supply the purified air and the water vapor to the battery module.

The metal air battery may further include: a first fluid regulator configured to regulate fluid communication between the water vapor supplied from the water vapor supply unit and the battery module.

The metal air battery may further include: a water vapor concentration measuring unit configured to measure a water vapor concentration of an inside of the battery module; and a controller configured to open and close the first fluid regulator according to the water vapor concentration of the inside of the battery module.

The metal air battery may further include: a second fluid regulator configured to regulate fluid communication between the water vapor recovered from the battery module and the water vapor recovery unit.

The metal air battery may further include: a water vapor concentration measuring unit configured to measure a water vapor concentration of an inside of the battery module; and a controller configured to open and close the second fluid regulator according to the water vapor concentration of the inside of the battery module.

The metal air battery may further include: a pump configured to apply a negative pressure to the battery module to recover the water vapor from the battery module.

The metal air battery may further include: a third fluid regulator configured to regulate a flow of the purified air supplied from the air purification module to the water vapor supply unit.

The metal air battery may further include: an oxygen concentration measuring unit configured to measure an oxygen concentration of an inside of the battery module; and a controller configured to open and close the third fluid regulator according to the oxygen concentration of an inside of the battery module.

The air purification module may operate by pressure swing adsorption (PSA), thermal swing adsorption (TSA), pressure thermal swing adsorption (PTSA), vacuum swing adsorption, or selective separation, or a combination thereof.

The vapor supply unit and the water vapor recovery unit may be in fluid communication with each other and are configured such that the water vapor recovered from the water vapor recovery unit may be transferred to the water vapor supply unit.

According to an aspect of another embodiment, a method of operating a metal air battery including a battery module configured to generate electricity by oxidation of metal and reduction of oxygen and water, includes: removing an impurity from air supplied to an air purification module to prepare a purified air; supplying the purified air to a water vapor supply unit to remove water vapor from the purified air and prepare dry purified air; supplying the dry purified air and the water vapor to the battery module; and recovering the water vapor from the battery module to a water vapor recovery unit.

The battery module may include: an anode including a metal; a cathode configured to use the oxygen and the water as an active material; and a solid electrolyte layer between the cathode and the anode.

The method may further include: measuring a water vapor concentration of an inside of the battery module during a discharge of the metal air battery; using a first fluid regulator configured to control flow of the vapor from the water vapor supply unit to the battery module according to the water vapor concentration of the inside of the battery module.

A second fluid regulator may be used to regulate flow of the water vapor recovered from the battery module to the water vapor recovery unit at a predetermined time interval, or to discharge the water vapor to an outside of the battery module at a predetermined time interval.

The method may further include: measuring a water vapor concentration of an inside of the battery module during charge of the metal air battery; and using a second fluid regulator to regulate flow of the water vapor from the battery module to the water vapor recovery unit according to the water vapor concentration of the inside of the battery module.

A pressure of the inside of the battery module is maintained by providing dry oxygen to the air purification module at a predetermined time interval, or providing dry air from the vapor recovery unit to the air purification module at a predetermined time interval.

The method may further include: measuring an oxygen concentration of an inside of the battery module during a discharge of the metal air battery; and using a third fluid regulator to regulate flow of the purified air supplied from the air purification module to the battery module according to the oxygen concentration of the inside of the battery module.

A second fluid regulator may be configured to regulate the flow of the purified air recovered from the battery module to the water vapor recovery unit at a predetermined time interval, or discharge of the purified air to an outside of the battery module at a predetermined time interval.

The method may further include: measuring a water vapor concentration of an inside of the battery module during a charge of the metal air battery; and applying a negative pressure to the battery module to transfer the water vapor from the battery module to the water vapor recovery unit.

A water and air handling system for a metal air battery includes: a water vapor supply unit configured to supply water vapor to the metal air battery; a water vapor recovery unit configured to recover the water vapor from the metal air battery; and an air purification module configured to purify air and supply the purified air to the water vapor supply unit.

A method of operating the water and air handling system includes removing an impurity from air supplied to the air purification module to prepare a purified air; supplying the purified air to a water vapor supply unit to remove water vapor from the purified air and prepare dry purified air; supplying the dry purified air and the water vapor to a metal air battery; and recovering the water vapor from the battery module using the water vapor recovery unit.

BRIEF DESCRIPTION OF THE DRAWINGS

These and/or other aspects will become apparent and more readily appreciated from the following description of the embodiments, taken in conjunction with the accompanying drawings in which:

FIG. 4 is a flowchart illustrating a method of operating a metal air battery according to an embodiment;

DETAILED DESCRIPTION

Figure 1:
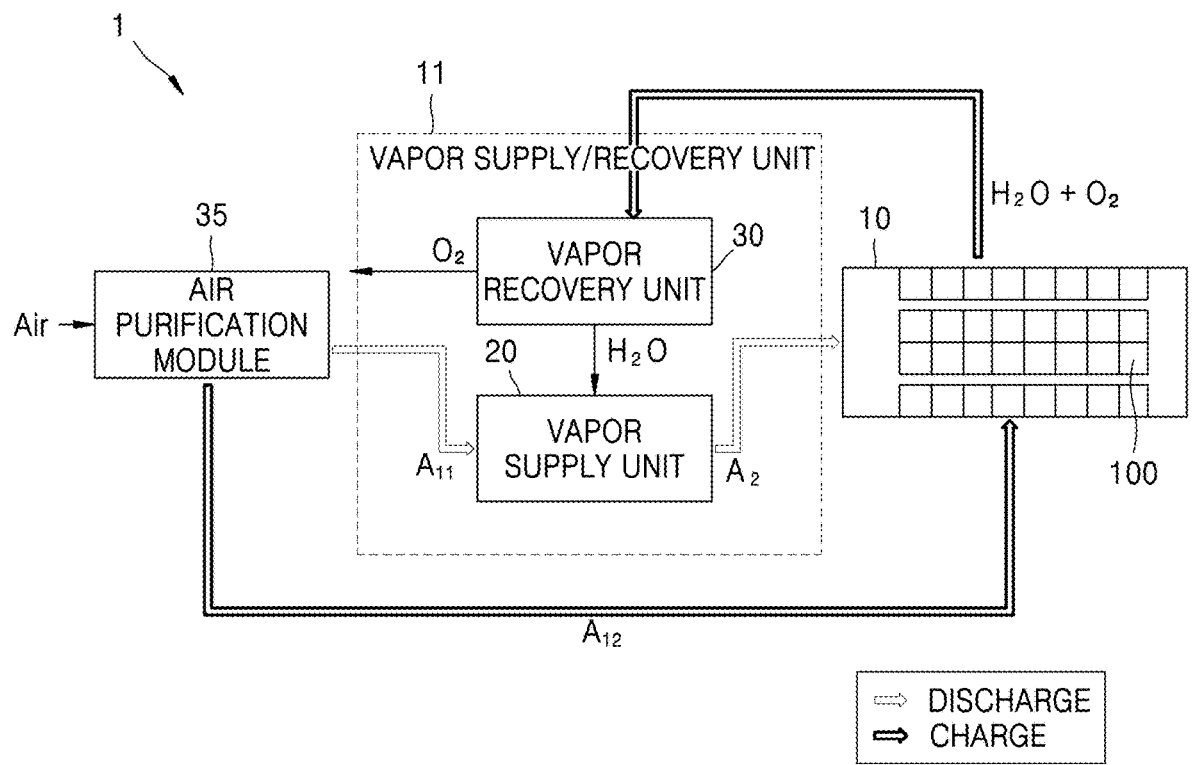
FIG. 1 is a block diagram showing a schematic configuration of a metal air battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Expressions such as "at least one of," when preceding a list of elements, modify the entire list of elements and do not modify the individual elements of the list. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a metal air battery and an air handling system for a metal air battery according to embodiments will be described in detail with reference to the accompanying drawings. The width and thickness of the layers or regions illustrated in the accompanying drawings may be somewhat exaggerated for clarity and ease of description. Like reference numerals designate like elements throughout the specification.

As used herein, the terms "vapor" and "water vapor" may be used interchangeably, and each refer to a dispersion of water molecules, which are dispersed in the air.

As used herein, the term "dry air" refers to air which is substantially free of any water vapor (moisture). For example, the air may contain less than 0.05% of water vapor, or less than 0.01% water vapor, or less than 0.005% water vapor, or less than 0.001% water vapor. For example, the air may contain 0% water vapor.

Figure 2:
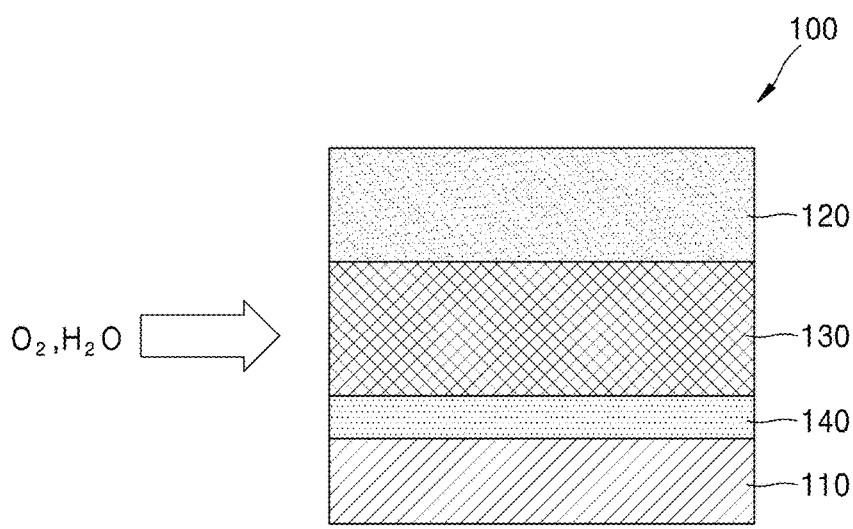
FIG. 2 is a schematic view of the battery shown in FIG. 1.
Figure 3:
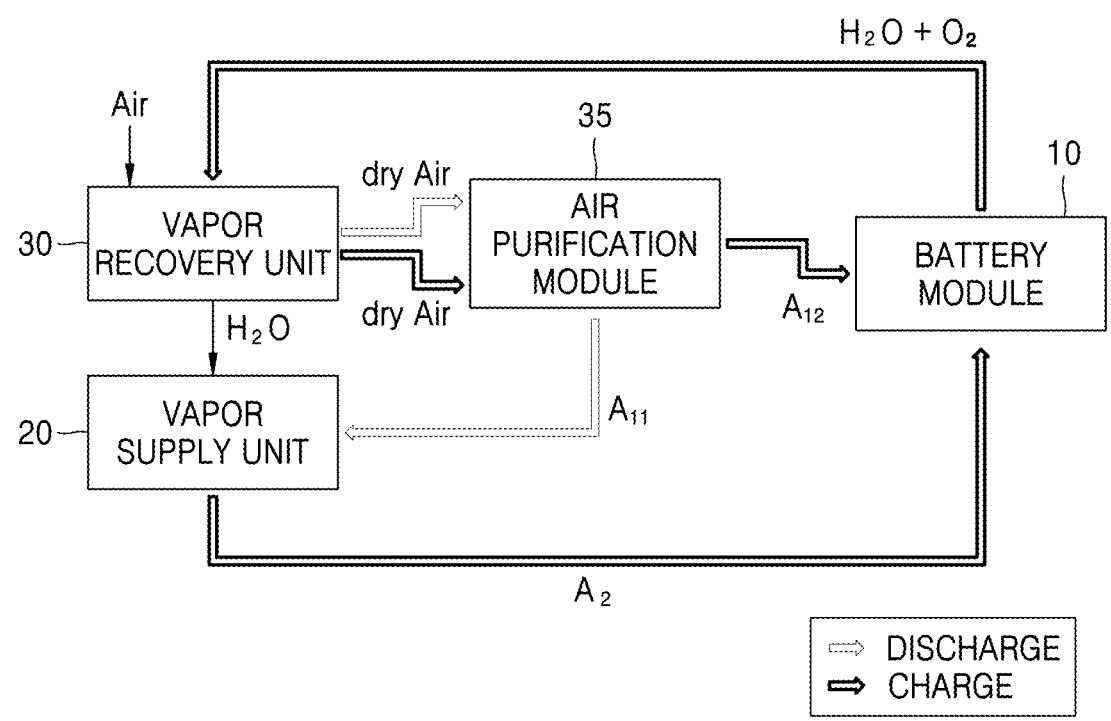
FIG. 3 is a block diagram showing a schematic configuration of a metal air battery according to another embodiment.

FIG. 1 is a block diagram showing a schematic configuration of a metal air battery 1 according to an embodiment. FIG. 2 is a schematic view of a cell 100 in the battery module 10 shown in FIG. 1. FIG. 3 is a block diagram showing a schematic configuration of the metal air battery 1 according to another embodiment.

Referring to FIGS. 1 and 2, the metal air battery 1 according to an embodiment may include a battery module 10, a water vapor supply/recovery unit 11 including a water vapor supply unit 20, and a water vapor recovery unit 30, and an air purification module 35. The battery module 10 may include a plurality of cells 100 and may generate electricity through the oxidation of metal and the reduction of oxygen and water vapor. The cell 100 according to an example may include an anode 110, a cathode 120, a solid electrolyte layer 130, and a anode electrolyte layer 140.

The anode 110 may include a material capable of absorbing and emitting (desorbing) metal ions. Such a material may include, for example, lithium (Li), sodium (Na), zinc (Zn), potassium (K), calcium (Ca), magnesium (Mg), iron (Fe), aluminum (Al), an alloy thereof, or a combination thereof. For example, the anode 110 may include lithium (Li). In this case, the anode 110 may include lithium, a lithium-based alloy, a lithium intercalating compound, or a combination thereof. When the anode 110 includes lithium, the metal air battery 1 according to the present embodiment may be referred to as a "lithium air battery".

The cathode 120 may be an electrode using oxygen $O_2$ and water vapor ($H_2O$) present in the air as an active material. For the electrochemical reaction between metal ions provided from the anode 110 and the gas (i.e., oxygen) and water vapor provided to the cathode 120, the cathode 120 may provide a movement path for metal ions and a movement path for electrons.

When the metal air battery 1 according to the present embodiment is the lithium air battery, the following electrochemical reaction shown in Equation 1 may occur in the cathode 120 during discharge.

$$2Li^+ + 1/2 O_2 + H_2O + 2e^- \leftrightarrow 2LiOH \quad (1)$$

Lithium ions $Li^+$ provided from the anode 110 and oxygen $O_2$ and water vapor provided from the atmosphere (air), may react together with electrons $e^-$ at a surface of the cathode 120 to generate lithium hydroxide LiOH. At this time, the cathode 120 may provide both a metal ion movement path of lithium ions $Li^+$ and an electron movement path of electrons $e^-$. The lithium hydroxide LiOH generated by the electrochemical reaction may be an example of a reaction product. Following charge, a discharge reaction may be reversely performed.

For example, the cathode 120 may include a composite conductive material capable of providing the movement paths of both lithium ions $Li^+$ and electrons $e^-$. To adjust a cation conductivity and an electron conductivity of the composite conductive material, a composition of the composite conductive material may be controlled by varying the components therein and/or by adding a dopant. Even when comparing composite conductive materials having the same composition, the cation conductivity and the electron conductivity may vary depending on the ratio of each material in the composite conductive material and the amount of dopant. The composite conductive material may include, for example, a lithium-based oxide, a sodium-based oxide, or a combination thereof.

The solid electrolyte layer 130 may provide a movement path for metal ions provided from the anode 110. For example, the solid electrolyte layer 130 may include a composite conductive material capable of both electronic conduction and metal ion conduction. To adjust the cation conductivity and electron conductivity of the composite conductive material, the composition ratio or the dopant of the composite conductive material may be adjusted accordingly. Even in case of materials having the same composition, the cation conductivity and the electron conductivity may vary depending on the composition ratio and the dopant. The composite conductive material may include, for example, a lithium-based oxide, a sodium-based oxide, or a combination thereof.

As described above, the composite conductive material included in the cathode 120 and the solid electrolyte layer 130 may be an inorganic-based solid compound. Accordingly, the cathode 120 may be an electrode that does not include an organic electrolyte, that is, an organic electrolyte-free electrode. The solid electrolyte layer 130 may also be organic electrolyte-free. Also, the cathode 120 may be an electrode that does not include a liquid electrolyte, and thus may be a liquid electrolyte-free electrode.

The anode electrolyte layer 140 may include an ion conductive material to allow conduction of ions between the anode 110 and the cathode 120. The anode electrolyte layer 140 may include a solid electrolyte (e.g., electrolyte having a solid phase). The solid electrolyte of the anode electrolyte layer 140 may include a polymer electrolyte, an inorganic electrolyte, or a composite electrolyte that is a mixture of the polymer electrolyte and the inorganic electrolyte. For example, the anode electrolyte layer 140 may include a polymeric nonwoven fabric such as a nonwoven fabric made of polypropylene, polyphenylene sulfide, or a combination thereof, a porous film including an olefin-based resin such as polyethylene or polypropylene, or a combination thereof. However, the specific material used for the solid electrolyte is not limited thereto and may be modified to include any suitable solid electrolyte material.

Although not shown in FIG. 2, a gas diffusion layer that absorbs oxygen from ambient air and provides oxygen to the cathode 120 may be disposed on the cathode 120. To this end, the gas diffusion layer may have a porous structure so as to smoothly diffuse oxygen. For example, the gas diffusion layer may be formed of a carbon paper, a carbon cloth, a carbon felt (e.g., carbon fiber), a sponge foam metal, a metal fiber mat, or a combination thereof. However, the cathode 120 may be manufactured to have a porous structure or a similar structure to serve as the gas diffusion layer. In this case, the gas diffusion layer may be omitted. In an alternative configuration, a cathode current collector may be disposed in contact with the gas diffusion layer and the anode current collector may be disposed in contact with the anode 110. For example, the anode current collector may be regarded as a part of the anode 110, and similarly, the cathode current collector may be regarded as a part of the cathode 120.

The metal air battery 1 according to the present embodiment may be a liquid electrolyte-free battery that does not include a liquid electrolyte. Also, the metal air battery 1 according to the present embodiment may be an organic electrolyte-free battery which does not include an organic electrolyte. Thus, the metal air battery 1 may be organic electrolyte-free, liquid electrolyte-free, or a combination thereof.

When the cell 100 is a liquid electrolyte-free cell, and the metal air battery is a liquid electrolyte-free full solid metal air battery, a decreased reaction rate may occur due to relatively low levels of metal ion conductivity, low levels of electron conductivity, and a large interface resistance between the cathode 120 and the solid electrolyte layer 130. To improve reaction rates and decrease resistance, an air intake system disposed in a metal air battery has been used to remove moisture. Meanwhile, in an embodiment, an additive, for example, water vapor, which is capable of improving the metal ion conductivity and the electron conductivity and reducing a surface resistance during a discharge process, is supplied to the full solid metal air battery. Also, water vapor generated during a charge process is recovered.

The vapor supply/recovery unit 11 may supply water vapor to the battery module 10 when the metal air battery 1 is discharged, and recover the water vapor from the battery module 10 when the metal air battery 1 is charged. For example, the vapor supply/recovery unit 11 may include a vapor supply unit 20 for supplying vapor to the battery module 10 and a vapor recovery unit 30 for recovering vapor from the battery module 10. At this time, the vapor supply unit 20 and the vapor recovery unit 30 may be integrally formed as shown in FIG. 1 or may be separately formed as shown in FIG. 3.

The vapor supply unit 20 is a supply device capable of supplying water vapor to the battery module 10 in order to improve the metal ion conductivity and the electron conductivity of the cathode 120 and reduce an interface resistance. For example, the vapor supply unit 20 may regulate a supply rate of the water vapor according to a charge/discharge rate of the metal air battery 1.

Without being limited by theory, it is understood that the water vapor supplied through the vapor supply unit 20 may adhere to the surface of the cathode 120 to improve the metal ion conductivity and the electron conductivity and reduce the interface resistance. The water vapor supplied through the vapor supply unit 20 may react with the electrons $e^-$ at the surface of the cathode 120 together with oxygen $O_2$ supplied from atmospheric air during the discharge process to generate lithium hydroxide LiOH, or may decompose lithium hydroxide LiOH during the charge process and return to water vapor.

The vapor recovery unit 30 may recover excess water vapor present in the battery module 10. For example, the vapor recovery unit 30 may be a vapor condenser, but is not limited thereto. According to an embodiment, the vapor supply unit 20 and the vapor recovery unit 30 may be in fluid communication with each other. At this time, the vapor recovery unit 30 may condense the water vapor recovered from the battery module 10 and deliver the water vapor to the vapor supply unit 20. Also, according to an example, air from outside of the metal-air battery (also referred to herein as "external air") may be introduced into the vapor recovery unit 30. At this time, the vapor recovery unit 30 may condense water vapor present in the outside air to remove the water vapor from the outside air.

The air purification module 35 may purify the air by removing impurities, such as water vapor, nitrogen ($N_2$), and carbon dioxide ($CO_2$), present in the air and supply the purified air to the battery module 10. The air purification module 35 may be disposed in direct fluid communication with the battery module 10 or may be disposed in fluid communication with the battery module 10 via the vapor supply unit 20. For example, when the vapor supply unit 20 and the vapor recovery unit 30 are integrally formed as shown in FIG. 1, the external air may flow directly into the air purification module 35. The air purification module 35 may remove impurities such as water vapor, nitrogen, and carbon dioxide from the air and supply purified air to the vapor supply/recovery unit 11. Since the water vapor has been removed, the purified air is supplied as dry air. Also, when the vapor supply unit 20 and the vapor recovery unit 30 are separately formed as shown in FIG. 3, the external air may flow into the vapor recovery unit 30 and may be dry air from which water vapor is removed. The air purification module 35 may remove impurities such as nitrogen, and carbon dioxide which may be present in the dry air.

The air purification module 35 may be configured to operate by pressure swing adsorption (PSA), thermal swing adsorption (TSA), pressure thermal swing adsorption (PTSA), vacuum swing adsorption, selective separation, or a combination thereof. As used herein, the term "PSA" means a technique in which a specific gas is preferentially adsorbed or captured on an adsorbent at high pressure and the specific gas is emitted or discharged when pressure is reduced. As used herein, the term "TSA" means a technique in which a specific gas is preferentially adsorbed or captured on an adsorbent at room temperature and the specific gas is emitted or discharged when the temperature increases. As used herein, the term "PTSA" means a technique including a combination of "PSA" and "TSA". As used herein, "VSA" means a technique in which a specific gas is preferentially adsorbed or captured on an adsorbent under approximate atmospheric pressure and the specific gas is emitted or discharged under vacuum. A more specific method of charging and discharging the metal air battery 1 according to an embodiment will be described with reference to FIG. 4.

FIG. 4 is a flowchart illustrating a method of operating a metal air battery according to an example.

Referring to FIGS. 1 and 4, in operation S110, external air may be introduced into the air purification module 35. The air purification module 35 may remove impurities present in the external air to purify the external air (purified external air). For example, the air purification module 35 may use pressure swing adsorption (PSA), thermal swing adsorption (TSA), pressure swing adsorption (PTSA), vacuum swing adsorption (VSA), selective separation, or a combination thereof, to remove impurities such as water vapor, nitrogen, and carbon dioxide from the external air and generate purified air $A_{11}$. At this time, the purified air $A_{11}$ may be oxygen $O_2$ from which water vapor is removed (e.g., dry purified air).

In operation S120, the purified air $A_{11}$ may be supplied from the air purification module 35 to the vapor supply unit 20. For example, when the purified air $A_{11}$ is supplied from the air purification module 35 to the vapor supply unit 20, the purified air $A_{11}$ may be combined with water vapor to provide water vapor and purified air ($H_2O+O_2$); $A_2$ state. The water vapor is further supplied from the vapor supply unit 20 and the water vapor is added to the purified air.

In operation S130, the water vapor and the purified air $A_2$ may be supplied to the battery module 10 from the vapor supply unit 20. For example, when the metal air battery 1 is discharged, the water vapor and the purified air $A_2$ may be supplied to the cathode 120, which uses the water vapor and oxygen as an active material. At this time, as may be seen in the above-mentioned reaction Equation 1, the metal air battery 1 may generate lithium hydroxide LiOH as a reaction product, and thereby generate electricity.

In operation S140, the water vapor may be recovered from the battery module 10 to the vapor recovery unit 30. For example, when the metal air battery 1 is charged, as may be seen in reaction Equation 1, the oxygen $O_2$ and the water vapor may be continuously generated by the cathode 120, and thus an amount of the oxygen $O_2$ and the water vapor may increase in the battery module 10. Therefore, when the metal air battery 1 is charged, the oxygen $O_2$ and the water vapor disposed in the battery module 10 may be appropriately released to the outside of the metal air battery depending upon the use conditions of the metal air battery 1 and/or the internal conditions of the battery module 10.

According to an embodiment, the water vapor generated during charge of the metal air battery 1 may be recovered through the vapor recovery unit 30. The water vapor $H_2O$ recovered by the vapor recovery unit 30 may be transferred to the vapor supply unit 20 and reused. The oxygen $O_2$ generated during charge of the metal air battery 1 may be discharged to the outside of the metal air battery through the battery module 10 or the vapor recovery unit 30. As a result, the amount of the water vapor and oxygen $O_2$ inside of the battery module 10 may be controlled to prevent deterioration in the charging efficiency of the metal air battery. Since the air purification module 35 may supply purified air $A_{12}$, accordingly, an internal pressure of the battery module 10 may be maintained over a predetermined range and the water vapor and oxygen $O_2$ may be discharged to the vapor recovery unit 30.

Figure 5A:
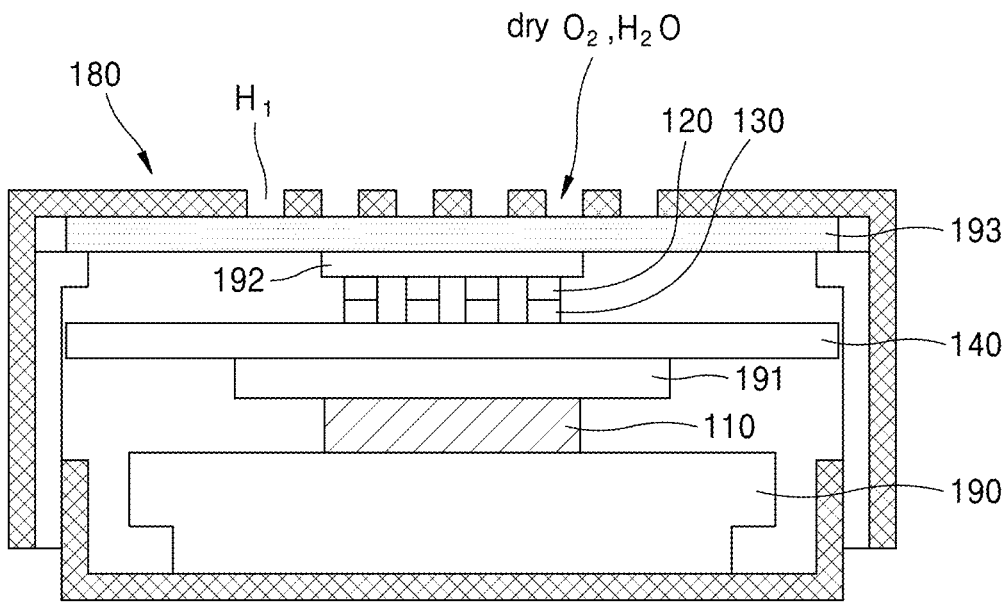
FIG. 5A is a cross-sectional view illustrating a configuration of a metal air battery according to an Example.
Figure 5B:
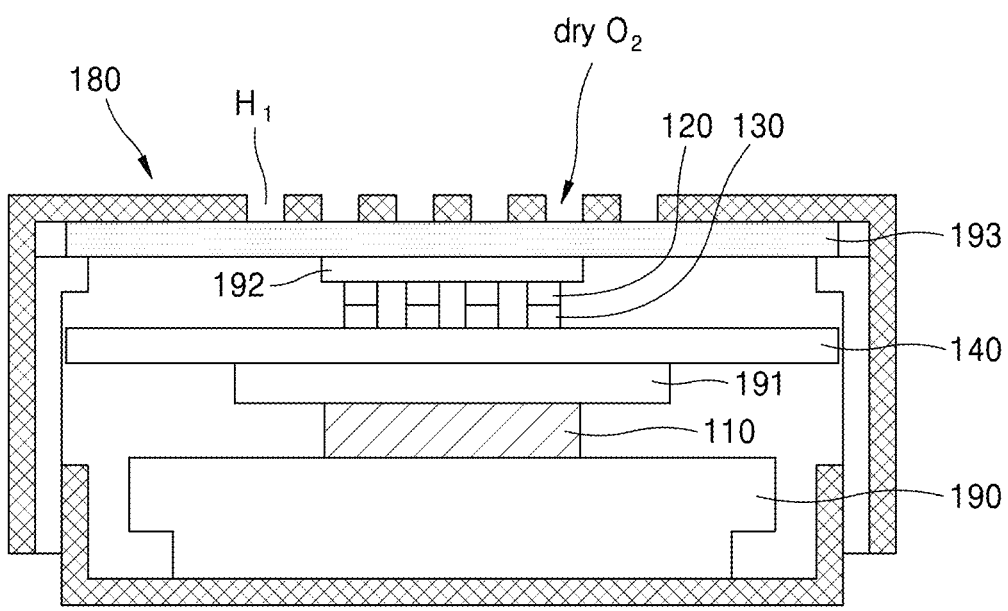
FIG. 5B is a cross-sectional view showing a configuration of a metal air battery according to a Comparative Example.
Figure 6:
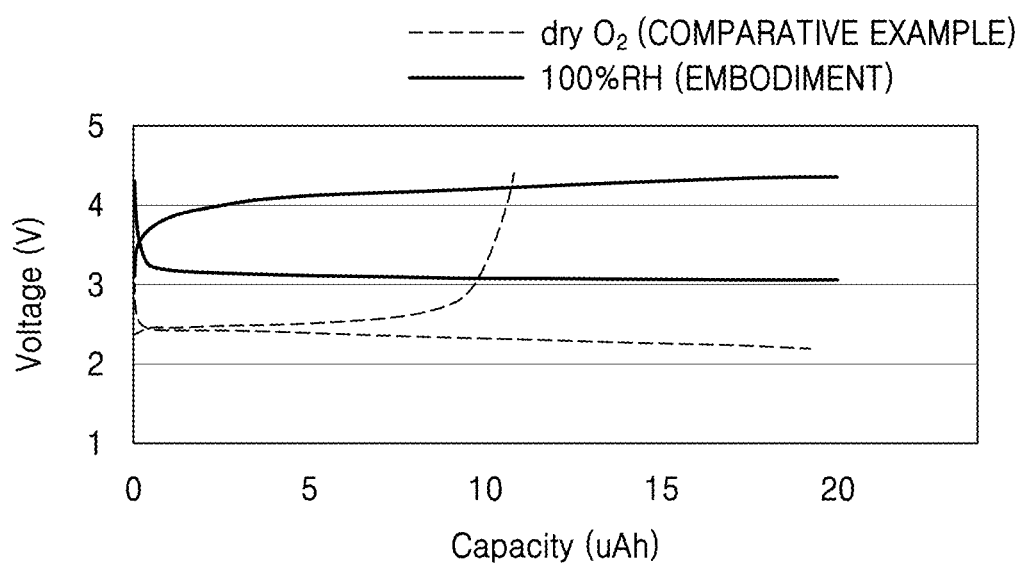
FIG. 6 is a graph of voltage (volts, V) versus capacity (microampere hours, μAh) showing experimental results of an electrochemical module according to an Example and a Comparative Example.

FIG. 5A is a cross-sectional view illustrating a configuration of a metal air battery according to an Example. FIG. 5B is a cross-sectional view showing a configuration of a metal air battery according to a Comparative Example. FIGS. 6 and 7 are respectively graphs showing experimental results of an electrochemical module for both the Example and the Comparative Example.

Referring to FIGS. 5A and 5B, the metal air batteries according to the Example and the Comparative Example are coin type batteries. The components of the battery are provided in a case 180 including a plurality of opening areas $H_1$. A support structure 190 may be provided on a lower surface of the case 180. The support structure 190 may include, for example, a spacer and a spring member. An anode 110 including a metal may be provided on the support structure 190. A reaction inhibiting layer 191 and the anode electrolyte layer 140 may be sequentially disposed on the anode 110. The reaction inhibiting layer 191 is interposed between the anode 110 and the anode electrolyte layer 140 and may suppress/prevent a reaction therebetween. The reaction inhibiting layer 191 may have an ion conductive function.

The cathode 120 and the solid electrolyte layer 130 may be disposed on the anode electrolyte layer 140. The cathode 120 and the solid electrolyte layer 130 may each have a structure including a plurality of pores. An electrically conductive material layer (hereinafter conductive layer) 192 may be provided on the cathode 120. A gas diffusion layer 193 may be provided on the conductive layer 192. In the Example, the gas diffusion layer 193 may be disposed adjacent to the plurality of opening areas $H_1$ and supplies the oxygen $O_2$ and the water vapor to the cathode 120. In the Comparative Example, the gas diffusion layer 193 is disposed adjacent to the plurality of opening regions $H_1$ and supplies only dry oxygen $O_2$ to the cathode 120.

For example, the anode 110 may include Li, the cathode 120 may include a lithium-lanthanum manganese oxide (LLMO), and the solid electrolyte 130 may include lithium aluminum titanium phosphate (LATP). The anode electrolyte layer 140 may further include 1 molar (M) lithium bis(trifluoromethanesulfonyl)imide/(poly (ethylene glycol) dimethyl ether)(LiTFSI/PEGDME). The conductive layer 192 may include Au. In the Example, the operating temperature of a battery included in the metal air battery 1 is set to 40 degrees Celsius (° C.), and the oxygen $O_2$ and the water vapor are supplied such that the relative humidity is 100%, and a charge/discharge cycle is performed at a constant current (CC) of 1 microampere per square centimeter (μA/cm$^2$). In the comparative example, the battery included in the metal air battery is set to an operating temperature of 40° C., dry oxygen $O_2$ is supplied to the cathode 120, and a charge/discharge cycle is performed at the constant current of 1 μA/cm$^2$.

As shown in FIG. 6, a comparison of the Example where the oxygen $O_2$ and the vapor $H_2O$ are supplied such that the relative humidity becomes 100% with the Comparative Example in which only the oxygen $O_2$ is supplied, it may be seen that a reaction voltage $E^0$ increases from 2.96 volts (V) (Comparative Example) to 3.4 V (Example), and the charge/discharge reproducibility and cyclability are improved. This means that a metal ion conductivity and an electron conductivity of the cathode 120 are improved and an interface resistance decreases. Therefore, the metal air battery 1 according to the embodiment in which the vapor $H_2O$ is added to the cathode 120 provided as a movement path for metal ions and electrons may be advantageous to improvement of the performance and increase of the lifespan of the battery.

Figure 7A:
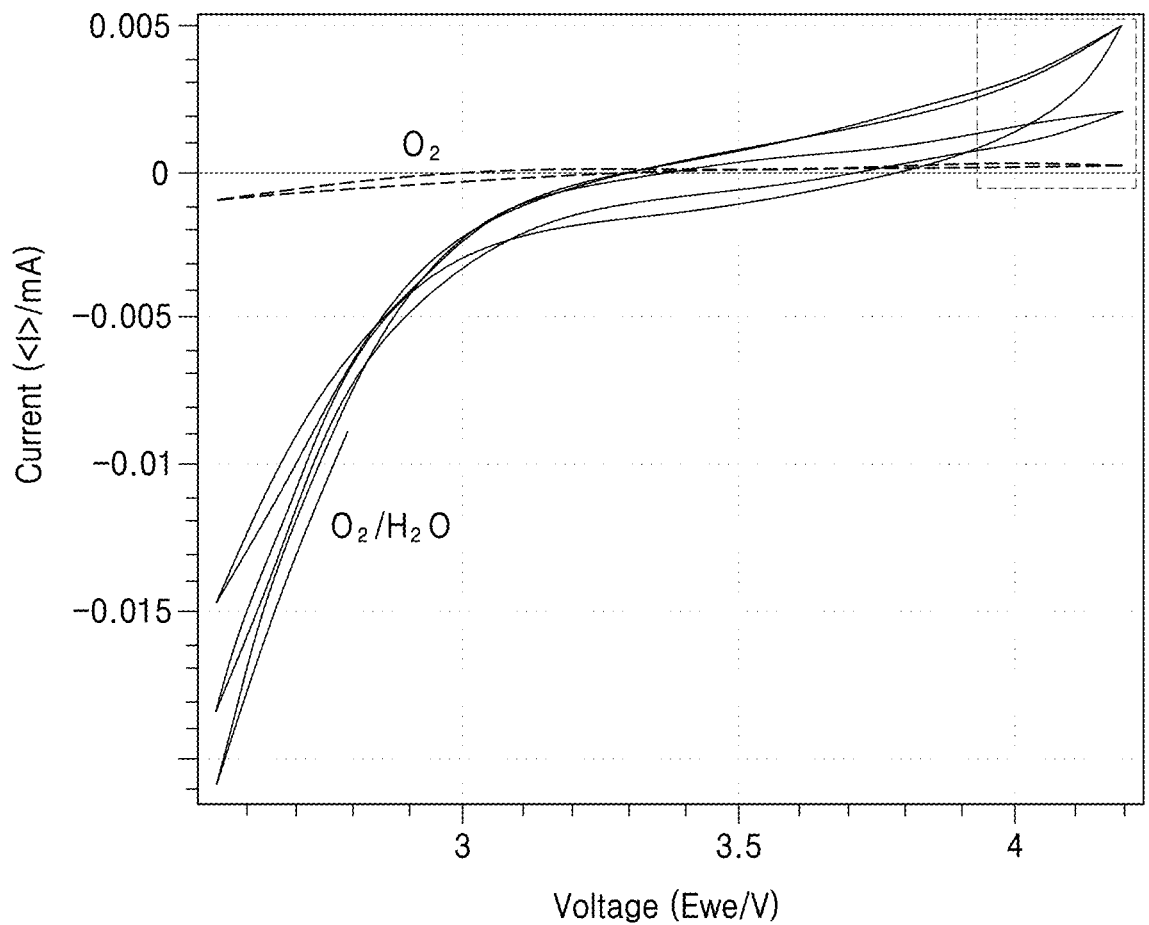
FIG. 7A is a voltammetric curve of current (I, milliampere (mA)) versus voltage of working electrode (Ewe, volts (V)) showing experimental results of an electrochemical module according to an Example and a Comparative Example.
Figure 7B:
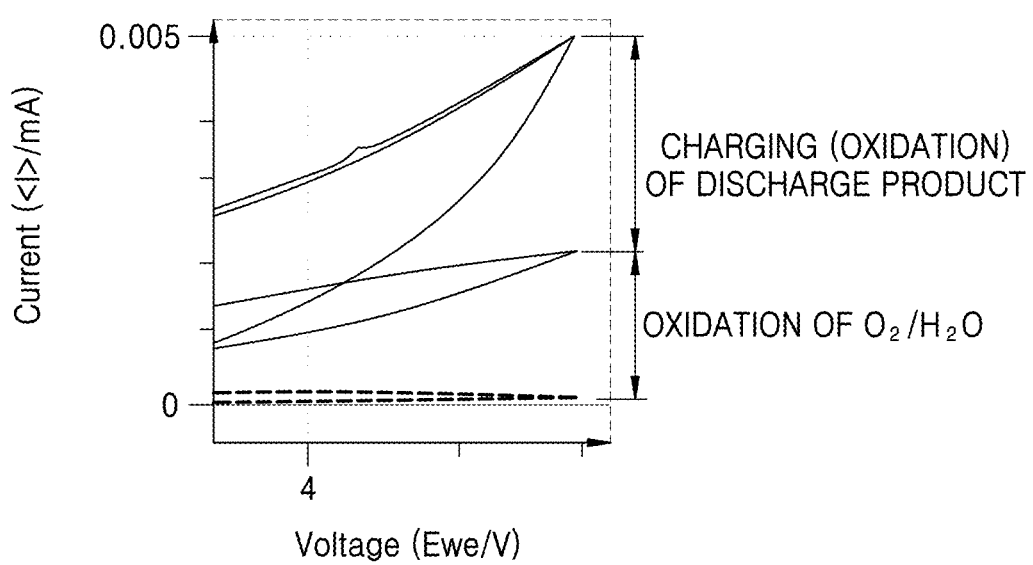
FIG. 7B is an expanded view of a portion of the graph in FIG. 7A.

Also, as shown in FIGS. 7A and 7B, in the Example where the oxygen $O_2$ and the water vapor are supplied such that the relative humidity becomes 100%, oxidation of the discharge product LiOH as well as the addition of oxidation products (oxygen and water vapor) after discharge results in deterioration of charge/discharge reproducibility and cyclability. Without being limited by theory, it is understood that the charge reproducibility is reduced by the presence of excess water vapor and oxygen generated in the cathode 120. Therefore, during charge of the metal air battery 1, removal of vapor and oxygen, which are discharge reaction products, from the battery module 10 according to internal conditions of the metal air battery 1, may prevent deterioration in the charging efficiency of the metal air battery 1. In addition, when the concentration of oxygen and water vapor supplied to the battery module 10 increases during discharge of the metal air battery 1, deterioration in the discharging efficiency of the metal air battery 1 may also be prevented. Accordingly, to prevent the deterioration in the charge and discharge efficiency of the metal air battery, the flow of oxygen and water vapor supplied to the battery module and the flow of oxygen and vapor discharged from the battery module may be controlled.

Figure 8A:
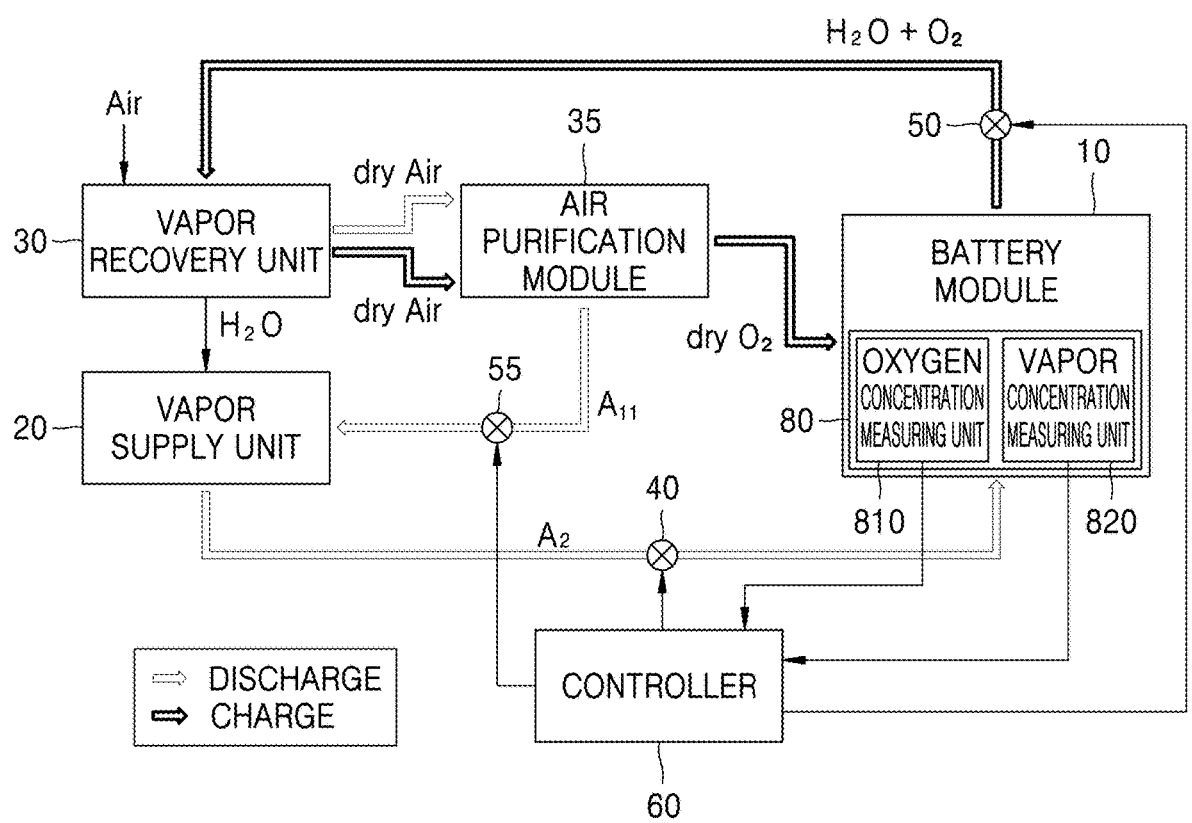
FIG. 8A is a block diagram showing a schematic configuration of a metal air battery according to another embodiment.
Figure 8B:
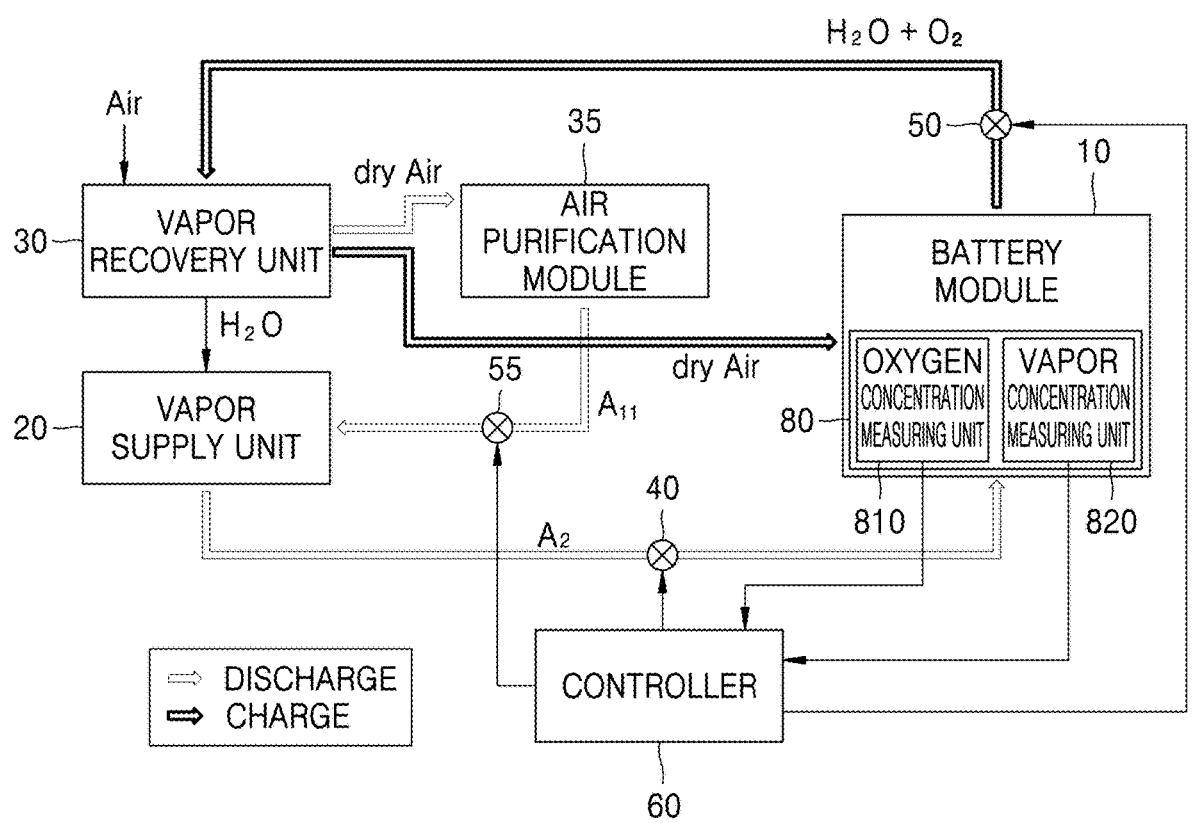
FIG. 8B is a block diagram showing a schematic configuration of a metal air battery according to an embodiment.
Figure 8C:
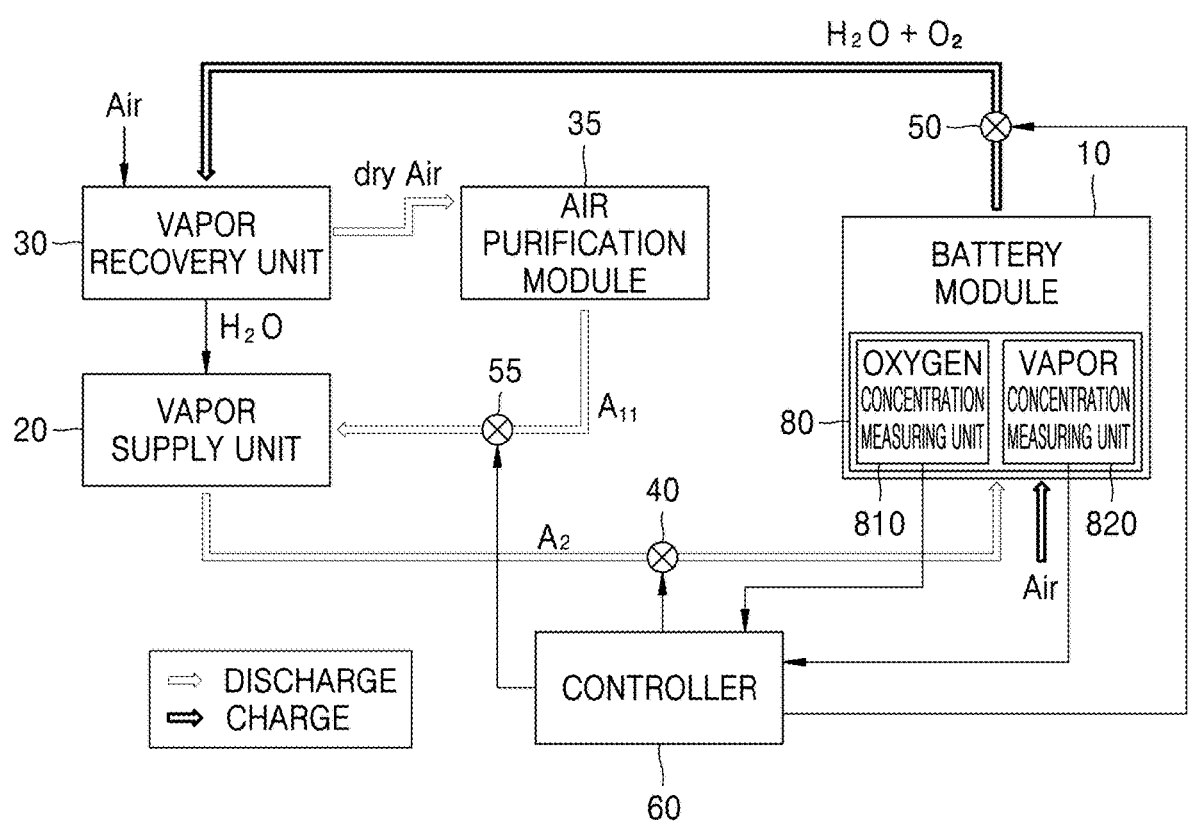
FIG. 8C is a block diagram showing a schematic configuration of a metal air battery according to an embodiment.
Figure 9:
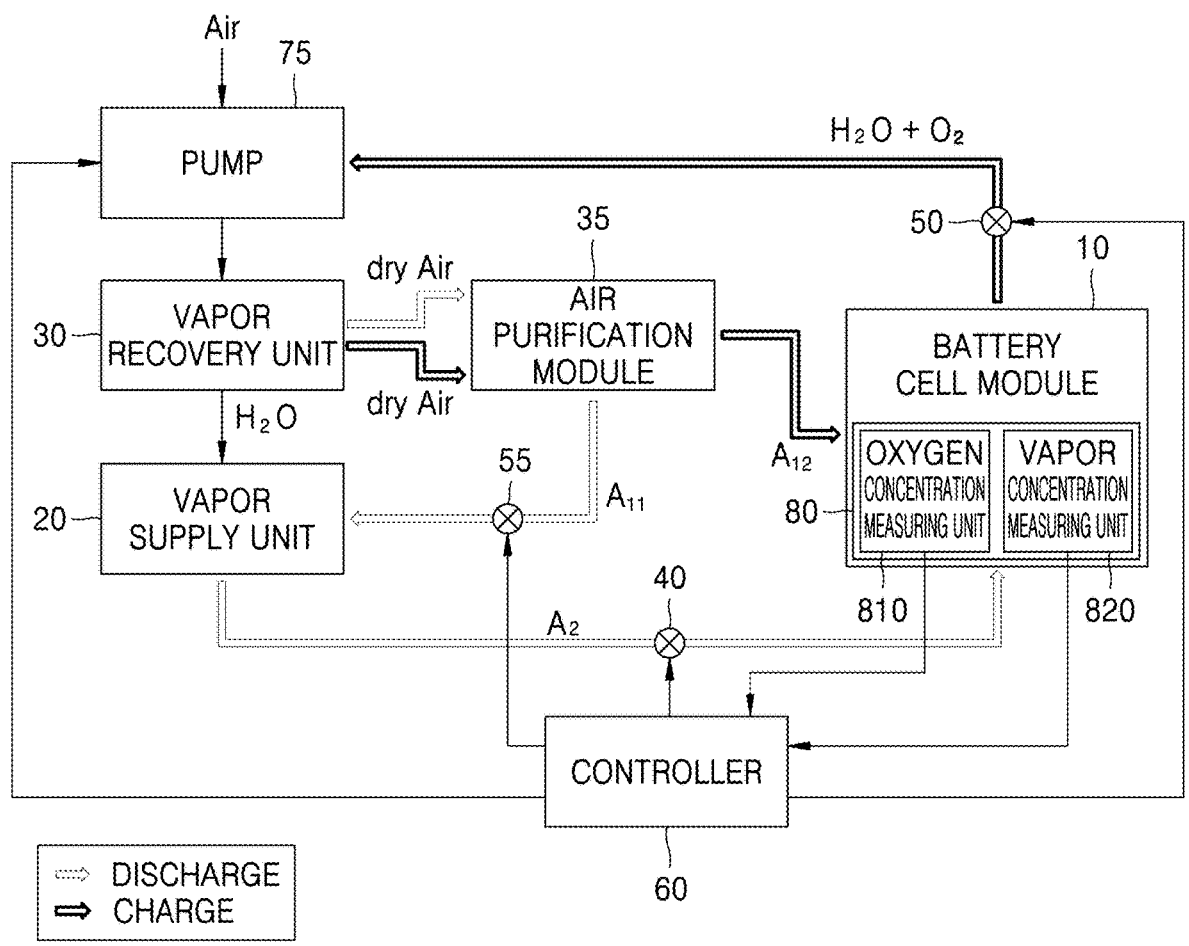
FIG. 9 is a block diagram showing a schematic configuration of a metal air battery according to an embodiment.

FIGS. 8A to 8C are block diagrams showing a schematic configuration of the metal air battery 1 according to another embodiment. FIG. 9 is a block diagram showing a schematic configuration of the metal air battery 1 according to yet another embodiment.

Referring to FIGS. 8A to 8C, the metal air battery 1 according to an example may include the battery module 10, the vapor supply unit 20, the vapor recovery unit 30, the air purification module 35, a first fluid regulator 40, a second fluid regulator 50, a controller 60, a third fluid regulator 55, and a measuring unit 80. Descriptions related to the battery module 10, the vapor supply unit 20, the vapor recovery unit 30, and the air purification module 35 are substantially the same as previously described for FIG. 3, and thus, the descriptions thereof will be omitted for convenience.

The first fluid regulator 40 is a flow modification device capable of regulating flow of the water vapor supplied from the vapor supply unit 20 to the battery module 10. In other words, the first fluid regulator is configured to modulate fluid communication between the vapor supply unit and the For example, the first fluid regulator 40 may be disposed downstream of a discharge part of the vapor supply unit 20 to regulate the flow of water vapor supplied to the battery module 10. During discharged of the metal air battery 1, as shown in the above-mentioned reaction equation, water vapor may be supplied to the cathode 120 and a water molecule may be used as an anode active material.

For example, the first fluid regulator 40 may be an electronically driven open/close valve and may control a flow rate of water vapor supplied from the water vapor supply unit to the battery module 10 by controlling the opening/closing of the valve. The electronically driven open/close valve may be driven by, for example a solenoid, which is an electronic driving device, and may switch between interruption and release of the open/close valve by turning on/off a pulse shape excitation current transmitted to the solenoid. The discharge of water vapor from the vapor supply unit 20 may be controlled to have high precision and high responsiveness by the first fluid regulator 40. The interruption and release timing of the electronically driven open/close valve is controlled by a control signal output from the controller 60 that will be described later.

The first fluid regulator 40 may change the opening area (opening degree) of the open/close valve and/or the opening time of the open/close valve, in order to control a flow of the water vapor discharged from the vapor supply unit 20. For example, the first fluid regulator 40 may control the flow of the water vapor discharged from the vapor supply unit 20 by an interruption cycle, which repeatedly switches between a flow interruption time (closed valve) and a flow release time (open valve).

The second fluid regulator 50 is a flow modification device disposed between the battery module 10 and the vapor recovery unit 30, and which is capable of regulating fluid communication between the battery module 10 and the vapor recovery unit 30. For example, the second fluid regulator 50 may be formed as an electronically driven open/close valve and may control the opening/closing of the valve to facilitate flow of oxygen and/or water vapor from the battery module 10 to the vapor recovery unit 30 during a charge of the metal air battery 1. The second fluid regulator 50 may also control the open/close valve to facilitate flow of a discharge product generated in the battery module 10 to the vapor recovery unit 30 during discharge of the metal air battery 1.

For example, the second fluid regulator 50 may also change an opening area (opening degree) of the open/close valve and/or an opening time of the open/close valve in order to control the flow of discharge products, for example, water vapor and oxygen, discharged from the battery module 10. For example, the second fluid regulator 50 may control the flow of oxygen and water vapor discharged from the battery module 10 by the interruption cycle which repeatedly switches between a glow interruption time and a flow release time.

Also, for another example, as shown in FIG. 9, a pump 75 capable of recovering water vapor by applying a negative pressure to the battery module 10 may be disposed between the battery module 10 and the vapor recovery unit 30. Accordingly, in the process of charging the metal air battery 1, the pump 75 may operate to recover the water vapor and oxygen from the battery module 10. The water vapor transferred to the vapor recovery unit 30 may be condensed and transferred to the vapor supply unit 20, and the oxygen delivered to the vapor recovery unit 30 may be discharged to the outside.

The third fluid regulator 55 is a flow modification device capable of regulating a flow of purified air supplied from the air purification module 35 to the battery module 10. For example, the third fluid regulator 55 may be disposed downstream of a discharge portion of the air purification module 35 to intercept (or facilitate) the flow of purified air supplied to the battery module 10.

For example, the third fluid regulator 55 may be an electronically driven open/close valve and may control a flow rate of the purified air supplied to the battery module 10 by driving the opening/closing of the open/close valve. The discharge of the purified air from the air purification module 35 may be controlled with high precision and high responsiveness by the third fluid regulator 55. The interruption and release timing of the electronically driven open/close valve is controlled by the control signal output from the controller 60 that will be described later.

The third fluid regulator 55 may change the opening area (opening degree) of the open/close valve and/or the opening time of the open/close valve, in order to control the flow of the purified air discharged from the air purification module 35. For example, the third fluid regulator 55 may control the flow of the purified air discharged from the air purification module 35 by the interruption cycle, which repeatedly switches between a flow interruption time (closed valve) and a flow release time (open valve).

The controller 60 may be a device that controls the overall function and operation of the metal air battery 1, and which is configured to store and execute a computer program. The controller 60 may execute a program stored in a memory (not shown) to control the first fluid regulator 40, the second fluid regulator 50, the third fluid regulator 55, and/or the pump 75 according to a discharge state and a charge state of the metal air battery 1. According to an example, the controller 60 may be implemented in the form of a single microprocessor module or a combination of two or more microprocessor modules. That is, the type of the controller 60 is not limited and may be any suitable device capable of storing and executing a program. For example, the controller 60 may be part of a battery management system (BMS).

The measuring unit 80 is configured to measure a status of the metal air battery 1 and then transmit information about the status to the controller 60. Here, the status of the metal air battery 1 may include a voltage of the metal air battery, a charge amount of the metal air battery, an oxygen concentration or a water vapor concentration inside of the battery module 10, or a combination thereof. To this end, the measuring unit 80 may include an oxygen concentration measuring unit 810, a vapor concentration measuring unit 820, or a combination thereof. However, the present disclosure is not limited thereto, and other status parameters that may affect the charge and discharge processes of the metal air battery 1 may also be measured.

Figure 10:
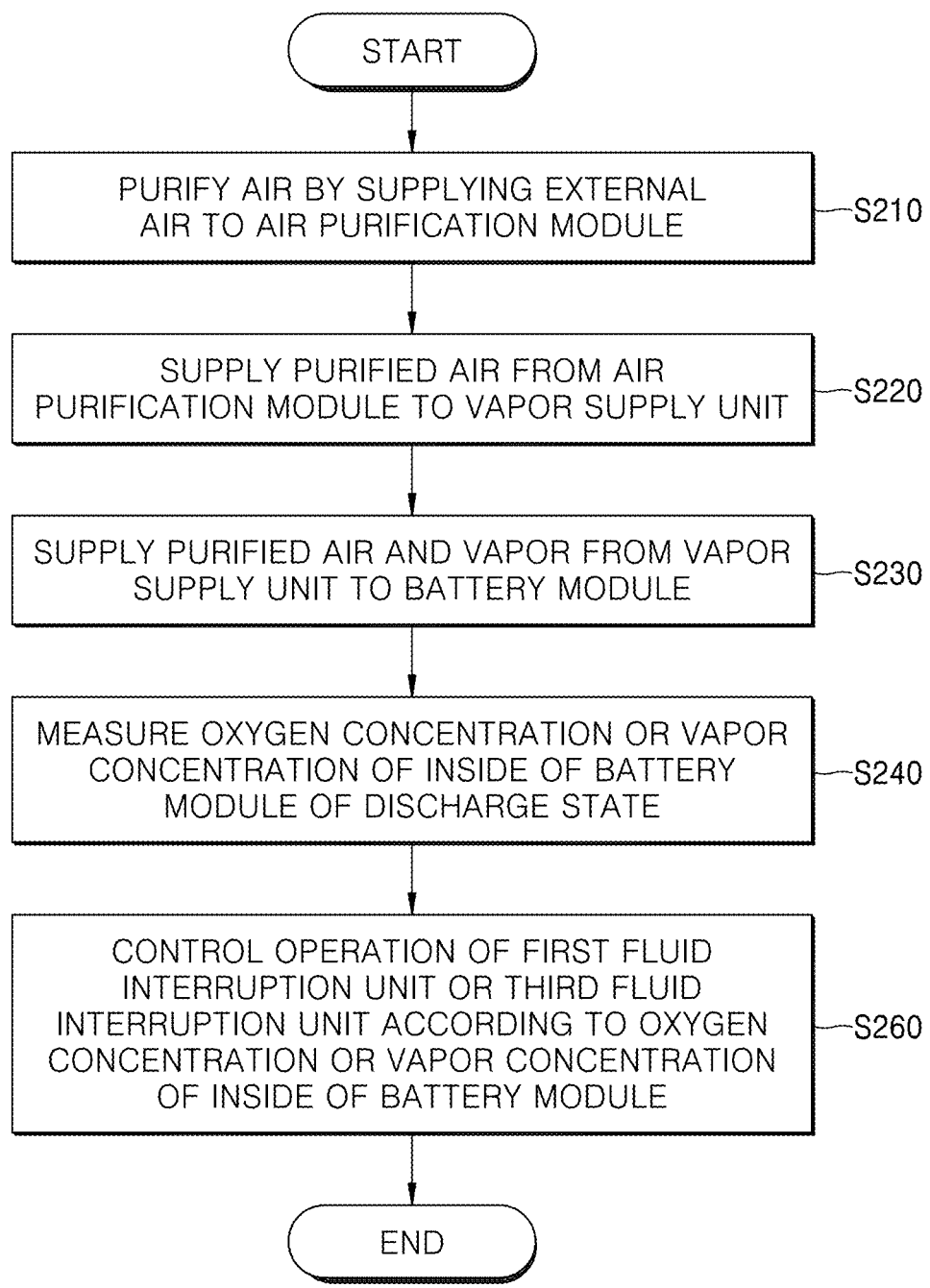
FIG. 10 is a flowchart illustrating a method of operating a metal air battery in a process of discharging the metal air battery according to an example.
Figure 11:
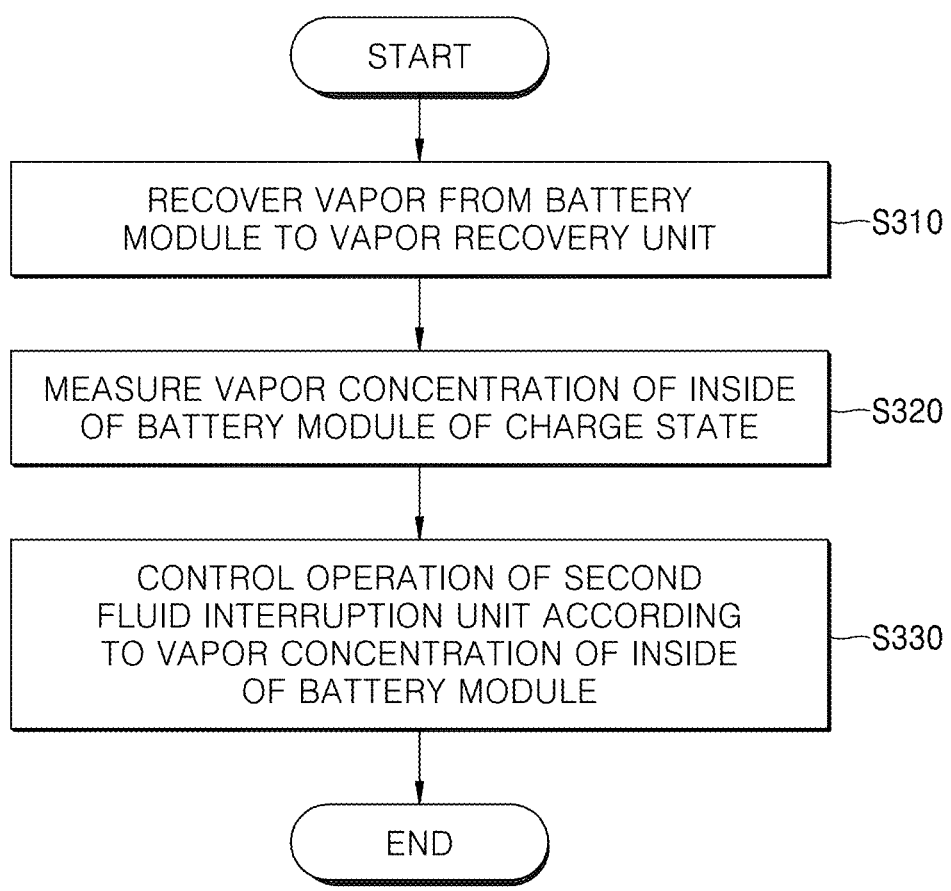
FIG. 11 is a flowchart illustrating a method of operating a metal air battery in a process of charging the metal air battery according to an example.

FIG. 10 is a flowchart illustrating a method of operating a metal air battery during discharge of the metal air battery according to an embodiment. FIG. 11 is a flowchart illustrating a method of operating a metal air battery during charge of the metal air battery according to an embodiment.

Referring to FIGS. 8A to 8C and 10, in operation S210, external air may be introduced into the air purification module 35. The air purification module 35 may remove impurities present in the external air to purify the external air. At this time, when the vapor supply unit 20 and the vapor recovery unit 30 are formed as separate structures, the external air may flow into the vapor recovery unit 30 and be discharged in a dry air state. Dry air may flow into the air purification module 35 and be discharged as the purified air $A_{11}$.

In operation S220, the purified air $A_{11}$ may be supplied by the air purification module 35 to the vapor supply unit 20. For example, the third fluid regulator 55 may open and close based upon a predetermined cycle in order to supply a suitable amount of the purified air $A_{11}$ from the air purification module 35 to the vapor supply unit 20.

In operation S230, both water vapor and the purified air $A_2$ may be supplied to the battery module 10 from the vapor supply unit 20.

For example, the open/close valve of the first fluid regulator 40 may open based on a predetermined cycle to supply a fluid, for example, water vapor and the purified air $A_2$, discharged from the vapor supply unit 20 to the battery module 10. At this time, the open/close valve of the second fluid regulator 50 may be closed in order to interrupt a flow of the fluid, for example, the water vapor and the purified air $A_2$ disposed in the battery module 10, such that the fluid disposed in the battery module 10 may not be discharged to the outside. Alternatively, the open/close valve of the second fluid regulator 50 may be cycled between a closed and opened state in order to interrupt and release the flow of the fluid disposed in the battery module 10, respectively, such that the fluid disposed in the battery module 10 may be discharged to the outside according to a predetermined time interval.

In operation S240, the oxygen concentration measuring unit 810 or the vapor concentration measuring unit 820 may measure an oxygen concentration or a water vapor concentration of an inside of the battery module 10 in a discharge state.

When the water vapor and the purified air $A_2$ are supplied from the vapor supply unit 20 and the air purification module 35, respectively, to the battery module 10 to discharge the metal air battery 1, the water vapor concentration and the oxygen concentration inside of the battery module 10 may change. At this time, the oxygen concentration measuring unit 810 or the water vapor concentration measuring unit 820 may measure a "current" (e.g., point in time) oxygen concentration or current water vapor concentration of the inside of the battery module 10.

In operation S260, the controller 60 may control an operation of the first fluid regulator 40 or the third fluid regulator 55 according to the oxygen concentration or the water vapor concentration of the inside of the battery module 10.

Information regarding the current oxygen concentration or vapor concentration of the inside of the battery module 10 may be transferred to the controller 60 by the oxygen concentration measuring unit 810 or the vapor concentration measuring unit 820. For example, the controller 60 controls the operation of the third fluid regulator 55 by comparing a preset (stored) reference oxygen concentration to the current oxygen concentration of the inside of the battery module 10 received from the oxygen concentration measuring unit 810. For example, when the oxygen concentration of the inside of the battery module 10 is less than the preset reference oxygen concentration, the interruption and release cycle of the third fluid regulator 55 may be adjusted such that a release time of the third fluid regulator 55 is increased.

Also, for example, the controller 60 controls the operation of the first fluid regulator 40 by comparing a preset (stored) reference vapor concentration to the current vapor concentration of the inside of the battery module 10 received from the vapor concentration measuring unit 820. When the vapor concentration of the inside of the battery module 10 is less than the preset reference vapor concentration, the interruption and release cycle of the first fluid regulator 40 may be adjusted such that a release time of the first fluid regulator 40 is increased.

Referring to FIGS. 8A to 8C and FIG. 11, in operation S310, the water vapor may be recovered from the battery module 10 and transferred to the vapor recovery unit 30. For example, when the metal air battery 1 is charged, as may be seen in the above-mentioned reaction equation 1, the oxygen $O_2$ and the water vapor may be continuously generated from the cathode 120, and thus, an amount of the oxygen $O_2$ and the water vapor may increase in the battery cell module 10.

The first fluid regulator 40 may regulate a flow of water vapor and the purified air $A_2$ such that the water vapor and the purified air $A_2$ may be prevented from flowing into the battery module 10. However, air which is not regulated first fluid regulator 40 may also be provided to the battery module to maintain pressure inside of the battery module 10 at a predetermined pressure, for example, as shown in FIGS. 8A to 8C. As shown in FIG. 8A, the dry oxygen $O_2$ which has been purified by the removal of water vapor, nitrogen, and carbon dioxide from external air by the air purification module 35, may be supplied directly to the battery module 10; as shown in FIG. 8B, dry air from which only water vapor has been removed from external air by the vapor recovery unit 30, may be supplied directly to the battery module 10; or as shown in FIG. 8C, the external air may be directly supplied to the battery module 10 from outside of the battery.

In operation S320, the vapor concentration measuring unit 820 may measure a water vapor concentration of the inside of the battery module 10 in a charge state.

When the metal air battery 1 is charged, oxygen and water vapor may be generated in the cathode 120 during the charge process, and accordingly the water vapor concentration and the oxygen concentration on the inside of the battery module 10 may change. The vapor concentration measuring unit 820 may measure a current water vapor concentration of the inside of the battery module 10. Although the current water vapor concentration of the inside of the battery module 10 may be measured in the present embodiment, the current oxygen concentration of the inside of the battery module 10 may also be measured using the oxygen concentration measuring unit 810. For example, the measuring of the current water vapor concentration and the current oxygen concentration may occur at the same time.

In operation S330, the controller 60 may control operation of the second fluid regulator 50 according to the current water vapor concentration of the inside of the battery module 10.

The information regarding the current water vapor concentration of the inside of the battery module 10 may be transferred to the controller 60 by the vapor concentration measuring unit 820. For example, the controller 60 controls the operation of the second fluid regulator 50 by comparing a predetermined reference vapor concentration with the current vapor concentration of the inside of the battery module 10 transferred from the vapor concentration measuring unit 820. For example, when the current water vapor concentration of the inside of the battery module 10 is greater than the reference vapor concentration, the interruption and release cycle of the second fluid regulator 50 may be adjusted such that a release time of the second fluid regulator 50 is increased. Also, as shown in FIG. 9, when the pump 75 capable of applying negative pressure to the battery module 10 is disposed downstream of the second fluid regulator 50, and the current water vapor concentration of the inside of the battery module 10 is greater than the reference vapor concentration, the controller 60 may operate the pump P to remove water vapor from the battery module 10, thereby lowering the water vapor concentration of the inside of the battery module 10. While the operation of the second fluid regulator 50 may be controlled according to the vapor concentration of the inside of the battery module 10, the controller 60 may also control the operation of the second fluid regulator 50 by comparing a predetermined reference oxygen concentration with the current oxygen concentration of the inside of the battery module 10.

According to the above-described embodiments, the metal air battery and the method of operating the metal air battery may include supply of water vapor to the anode during discharge of the metal air battery and recovery of the water vapor generated during charge of the metal air battery in order to control a water vapor concentration and adjust charge and discharge states, thereby preventing deterioration of the charge and discharge efficiency of the metal air battery. The metal air battery may be utilized as a power source in various electronic devices including electric vehicles. The metal air battery according to the embodiments may be applied to all fields in which a secondary battery is applied. Also, according to the above-described embodiments, the metal air battery and the method of operating the metal air battery may supply water vapor to improve a metal ion conductivity and an electron conductivity and reduce interface resistance.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A metal air battery comprising:
   a battery module configured to generate electricity by oxidation of a metal and reduction of oxygen and water;
   a water vapor supply unit configured to supply water vapor to the battery module; and
   a water vapor recovery unit configured to recover the water vapor from the battery module,
   wherein the battery module comprises
      an anode comprising a metal,
      a cathode configured to use the oxygen and the water vapor as an active material, and
      a solid electrolyte layer between the cathode and the anode.

2. The metal air battery of claim 1, further comprising an air purification module configured to purify air introduced from an outside of the battery module and supply the purified air to the water vapor supply unit.

3. The metal air battery of claim 2, wherein the water vapor supply unit is configured to supply the purified air and the water vapor to the battery module.

4. The metal air battery of claim 2, further comprising: a third fluid regulator configured to regulate a flow of the purified air supplied from the air purification module to the water vapor supply unit.

5. The metal air battery of claim 4, further comprising:
   an oxygen concentration measuring unit configured to measure an oxygen concentration of an inside of the battery module; and a controller configured to open and close the third fluid regulator according to the oxygen concentration of an inside of the battery module.

6. The metal air battery of claim 2, wherein the air purification module operates by pressure swing adsorption, thermal swing adsorption, pressure thermal swing adsorption, vacuum swing adsorption, selective separation, or a combination thereof.

7. The metal air battery of claim 1, further comprising: a first fluid regulator configured to regulate fluid communication between the water vapor supplied from the water vapor supply unit and the battery module.

8. The metal air battery of claim 1, further comprising: a second fluid regulator configured to regulate fluid communication between the water vapor recovered from the battery module and the water vapor recovery unit.

9. The metal air battery of claim 8, further comprising:
a water vapor concentration measuring unit configured to measure a water vapor concentration inside of the battery module; and
a controller configured to open and close the second fluid regulator according to the water vapor concentration of an inside of the battery module.

10. The metal air battery of claim 1, further comprising: a pump configured to apply a negative pressure to the battery module to recover the water vapor from the battery module.

11. The metal air battery of claim 1, wherein the water vapor supply unit and the water vapor recovery unit are in fluid communication with each other and are configured such that the water vapor recovered from the water vapor recovery unit is transferred to the water vapor supply unit.

* * * * *